United States Patent [19]

Mostafavi

[11] Patent Number: 5,642,444
[45] Date of Patent: Jun. 24, 1997

[54] SPECIALIZED IMAGE PROCESSING SYSTEM ARCHITECTURE AND METHOD FOR IMAGE DATA ARRAYS

[76] Inventor: M. Taghi Mostafavi, 2230 Clonmel Pl., Charlotte, N.C. 28262

[21] Appl. No.: 282,204

[22] Filed: Jul. 28, 1994

[51] Int. Cl.$^6$ ................................................. G06K 9/54
[52] U.S. Cl. .................................... 382/303; 382/209
[58] Field of Search ............................. 382/302, 303, 382/209; 364/710.09, 740, 785

[56] References Cited

U.S. PATENT DOCUMENTS

| | | | |
|---|---|---|---|
| 3,069,654 | 12/1962 | Hough | 340/146.3 |
| 4,190,669 | 2/1980 | Gorin et al. | 364/200 |
| 4,481,593 | 11/1984 | Bahler | 364/513.5 |
| 4,489,434 | 12/1984 | Moshier | 381/43 |
| 4,489,435 | 12/1984 | Moshier | 381/43 |
| 4,524,455 | 6/1985 | Holsztynski et al. | 382/303 |
| 4,541,114 | 9/1985 | Rutenbas et al. | 382/303 |
| 4,592,086 | 5/1986 | Watari et al. | 381/43 |
| 4,622,632 | 11/1986 | Tanimoto et al. | 364/200 |
| 4,860,375 | 8/1989 | McCubbrey et al. | 382/303 |
| 4,864,629 | 9/1989 | Deering | 382/34 |
| 4,949,390 | 8/1990 | Iverson et al. | 382/49 |
| 5,014,327 | 5/1991 | Potter et al. | 382/14 |
| 5,046,190 | 9/1991 | Daniel et al. | 382/303 |

FOREIGN PATENT DOCUMENTS

| | | |
|---|---|---|
| 3545106 | 6/1987 | Germany . |
| 3-044779 | 2/1991 | Japan . |
| 3-214283 | 9/1991 | Japan . |
| 3-268054 | 11/1991 | Japan . |

OTHER PUBLICATIONS

H. Wechsler, *An Overview of Parallel Hardware Architectures for Computer Vision*, International Journal of Pattern Recognition and Artificial Intelligence, vol. 6, No. 4, 1992, pp. 629–649.

L.M. Napolitano, Jr., D.D. Andaleon, K.R. Berry, P.R. Bryson, S.R. Klapp, J.E. Leeper and G.R. Redinbo, *A Special Purpose Computer for Automatic Target Recognition*, IEEE International Conference on Acoustics, Speech and Signal Processing, vol. III, 1989, pp. 1564–1167.

Chen–Yi Lee, Francky V.M. Catthor, Hugo J. De Man, *An efficient ASIC Architecture for Real–Time Edge Detection*, Transactions on Circuits and Systems, vol. 36, No. 10, Oct. 1989, pp. 1350–1359.

G. Priatko and R. Andersen, *A Real–Time Parallel Pipelined Data–Flow Image Processing System*, IEEE Nuclear Science Symposium, Jan. 1990.

Chun–Hsien Chou and Yung–Chang Chen, *A VLSI Architecture for Real–Time and Flexible Image Template Matching*, IEEE Transactions on Circuits and Systems, vol. 36, No. 10, Oct. 1989, pp. 1336–1342.

(List continued on next page.)

*Primary Examiner*—Leo Boudreau
*Assistant Examiner*—Chris Kelley

[57] ABSTRACT

An image processing system and method for an array of image data having a plurality of rows and columns, includes a plurality of serially connected processing elements. Each of the processing elements includes a data input and a data output, with the data output of an immediately preceding processing element being connected to the data input of an immediately succeeding processing element. Each processing element shifts image data from the data input thereof to the data output thereof to serially shift the array of image data through the processing elements. All processing elements have the same template control signals and other control signal lines. Each of the processing elements includes a Column Flag Select register which is used to demarcate the rows of the image data array. Each processing element also includes a Mask Processing Element register which allows a processing element to be bypassed if it is unneeded or is defective. A high speed, flexible and expandable image processing system is thereby provided.

33 Claims, 3 Drawing Sheets

OTHER PUBLICATIONS

H.D. Cheng and L.T. Kou, *Parallel Processing for Digital Picture Comparison*, Proceedings of the Workshop on Space Technologies, vol. 2, Jul. 1987, pp. 155–161.

L. Uhr, *VLSI and Modern Signal Processing, Multicomputer Parallel Arrays, Pipelines, and Pyramids for Pattern Perception*, Chapter 23, Prentice–Hall, Inc., 1985, pp. 406–421.

C. Brown, *A Programming Environment for Parallel Vision Algorithms*, Report No. ETL–0563, Apr. 1990, pp. 2–61.

I. Masaki, *Parallel/Pipelined Processor Dedicated to Visual Recognition*, 1985 IEEE International Conference on Robotics and Automation, pp. 100–107.

J. Peckham, J. Green, J. Canning, P. Stephens, *Logos —A Real Time Hardware Continuous Speech Recognition System*, IEEE International Conference on Acoustics, Speed and Signal Processing, 1982, pp. 863–866.

H.D. Cheng, C. Tong, *VLSI Architecture for Curve Detection*, Fourth International IEEE VLSI Multilevel Interconnection Conference, 1987, pp. 152–155.

H. Mack and S.S. Reddi, *Supertracker: A Programmable Parallel Pipeline Arithmetic Processor for Auto–Cueing Target Processing*, SPIE vol. 219, Electro–Optical Technology for Autonomous Vehicles, 1980, pp. 156–158.

D.H. Ballard, *Generalizing the Hough Transform to Detect Arbitrary Shapes*, Pattern Recognition, vol. 13, No. 2, 1980, pp. 111–222.

Stephen D. Shapiro, *Generalization of the Hough Transform for Curve Detection in Noisy Digital Images*, Proc. 4th Int. Joint Conf. Pattern Recognition, Kyoto, Japan, 1987.

SPECIALIZED IMAGE PROCESSING SYSTEM ARCHITECTURE AND METHOD FOR IMAGE DATA ARRAYS

FIELD OF THE INVENTION

This invention relates to data processing systems and methods, and more particularly to image processing systems and methods.

BACKGROUND OF THE INVENTION

Image processing is increasingly being used for optical character recognition, machine vision, military targeting and many other applications. In image processing systems and methods, an array of image data, arranged in a plurality of rows and columns, is typically compared to a template corresponding to a known or desired pattern. Pattern recognition typically requires massive data processing which increases proportionally with the number of image data points or pixels in the image data array. The number of pixels also increases proportionally to an increase in the quality of verification of specific patterns. Thus, high speed image processing systems and methods are needed which can handle high resolution images in real time.

Image processing systems and methods have typically been implemented using either high speed general purpose data processors or specialized image processing architectures. Unfortunately, imaging systems and methods implemented on general purpose data processors are flexible but slow. Conversely, image processing systems and methods implemented using specialized architecture tend to be fast but inflexible.

In particular, image processing systems and methods have been implemented in software for general purpose data processors. In order to reduce computational complexity, these systems and methods typically require preprocessing of the image for feature extraction that includes geometric edge detection, edge thinning, compression or other characteristics. This preprocessing produces a loss of significant information from the original image, thus resulting in a decrease in performance for many pattern matching applications. Moreover, template matching for large size patterns on general purpose data processors is extremely time consuming, thereby rendering general purpose processors unacceptable for use in applications requiring pattern recognition and comparison at near millisecond rates.

In order to solve this speed problem, specialized architectures have been developed for image processing. These specialized architectures, when implemented in hardware, typically use a plurality, and often a large number, of processing elements which are interconnected in an array of rows and columns to correspond to the rows and columns of the image data. Because the image data is processed in parallel, high speed processing is possible. Unfortunately, such specialized architectures sacrifice flexibility in the quest for obtaining high speed processing. For example, the organization of the interconnected processing elements into rows and columns is typically fixed so that it is difficult to process images having an arbitrary number of rows and columns. Inter-processing element connections and control connections also become increasingly complex as the number of processing elements increases. Moreover, since such specialized architecture is typically designed to process images of a predetermined number of rows and columns, it is difficult to expand the specialized architecture to add necessary rows and columns. Finally, when using large numbers of processing elements, a single processing element may sometimes be defective. Since many processing elements are typically formed in a single integrated circuit chip, it is difficult to substitute a working processing element for a defective processing element. Thus, the chip may need to be discarded.

SUMMARY OF THE INVENTION

It is therefore an object of the invention to provide improved image processing systems and methods for an array of image data.

It is another object of the invention to provide systems and methods for processing an array of image data at high speed.

It is yet another object of the invention to provide image processing systems and methods which are capable of processing arrays of image data of various sizes.

It is still another object of the present invention to provide image processing systems and methods which are capable of expansion to process larger arrays of image data.

It is a further object of the present invention to provide image processing systems and methods which can process an array of image data notwithstanding defective processing elements therein.

It is still a further object of the present invention to provide an interconnection scheme of processing elements that does not require overlap of data and control lines among processing elements.

These and other objects are provided, according to the present invention, by an image processing system for an array of image data arranged in a plurality of rows and columns, wherein the image processing system includes a plurality of serially connected processing elements. Each of the processing elements includes a data input and a data output, with the data output of an immediately preceding processing element being connected to the data input of an immediately succeeding processing element.

A host computer serially provides the array of image data to the data input of a first of the serially connected processing elements. A series of signals representing template data elements is also generated and the same signals are applied to each of the processing elements simultaneously. A series of control signals is also generated and the same control signals are applied to each of the processing elements simultaneously.

Each processing element includes means for shifting image data from the data input thereof to the data output thereof to serially shift the array of image data through the first processing element. Finally, each of the processing elements includes means for processing image data at the input thereof using the template signals applied thereto.

Accordingly, high speed image processing is provided by each processing element of the plurality of processing elements, operating in parallel. For higher speed, additional processing elements can be added to the last processing elements in the series. The same control signals and template signals are applied to each processing element at a given time. Thus, expansion of the image processing system does not require complex control connections. Additional processing elements are added by serially connecting inputs to outputs, and the common template and control signals are connected to each of the added processing elements. Thus, the connection of processing elements allows expansion of the image processing system.

According to another aspect of the present invention, each of the processing elements includes column indicating means which is responsive to a column indicating signal.

The column indicating means indicates to the associated processing element that the associated processing element corresponds to a predetermined one of the plurality of columns in the image data. Thus, the design of the processing elements allows demarcation of the plurality of rows of image data. An arbitrary size of the plurality of rows and columns is processed by the processing elements.

The column indicating means preferably indicates that the associated processing element corresponds to a first one of the plurality of columns, thereby demarcating the rows of image data. The column indicating means preferably comprises a Column Flag Select register in each processing element, which stores therein a first binary value if the associated processing element corresponds to the predetermined (first) of the columns, and a second binary value otherwise. Thus, when performing the image and template data processing, the data processing means in the processing element is aware of the demarcation of the rows. The system thus can process arrays of arbitrary size.

According to yet another aspect of the present invention, each of the processing elements also includes masking means which is responsive to a masking signal for bypassing the associated processing means in the processing element. The masking means can be used for at least two purposes. First, it is used to mask those processing elements at the end of the processing elements which are larger than the product of the number of rows and columns of the image data. Second, it is used to mask defective processing elements so that an integrated circuit chip can be used even though one or more processing elements are defective. Thus, an arbitrary size array of image data is processed by the system and the system need not have the same number of processing elements as the number of data elements in the image data.

The masking means is preferably implemented by a Mask Processing Element register which stores therein a first binary value if the associated comparing means is bypassed and a second binary value otherwise. The processing element is responsive to the Mask Processing Element register to couple the associated data input to the associated data output in response to the first binary value and to couple the associated data input to the comparing means in response to the second binary value.

Operation of the image processing system begins by initializing the system. Template signals are generated for use by the data processors to perform pattern recognition. Based on the number of data elements in a row of the image data to be processed, the columns in the processing elements are demarcated. Preferably, column demarcation takes place by serially shifting a binary value into a data register, and downloading to all Column Flag Select registers at once, a first binary value if the associated processing element corresponds to the first one of the columns and a second binary value otherwise. Unused and/or defective processing elements are masked so that the total number of active processing elements in the array is preferably equal to the number of data elements in the image data and/or a multiple of the number of data elements in a row. Masking preferably takes place by storing in the Mask Processing Element register of each processing element, a first binary value if the associated comparing means is bypassed and a second binary value otherwise.

After the above described initialization operations, processing of the image data proceeds. The first image data element or pixel is applied to the first processing element and the first template signals are applied to all of the processing elements. The same control signals are also applied to each processing element simultaneously. Within each processing element, a processing circuit indicates whether an intersect of input image data and the corresponding arbitrary reference point of template data is present in the processing element, and a counter is incremented if an intersect is found. The image data elements are then shifted to the next processing element and the next image data element is applied to the first processing element. A next template signals are applied to all processing elements and the processing is again performed at all processing elements.

The operations of shifting the next image data element to the first processing element and shifting the preceding data elements to a next sequential processing element, applying common template signals and processing, are sequentially performed until the last image data element is in the last processing element, or the last active template signal is used, whichever comes first. At this point, the counters in each processing element will have accumulated a total count of the number of intersects. These counters are loaded into shift registers within each processing element and the count data is then shifted out of the processing elements. Conventional post processing may then be used to locate the pattern matches based on the match data. All possible translations of the pattern having the same size and orientation will also be found at once.

Each of the above described aspects of the invention may be used independently to provide an improved image processing system and method. However, preferably, the unique connection of processing elements, common control signals, column demarcation and processing element masking are all used together to provide high performance image processing systems and methods which possess the high speed of special purpose architectures with the flexibility and expandability of general purpose processors.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
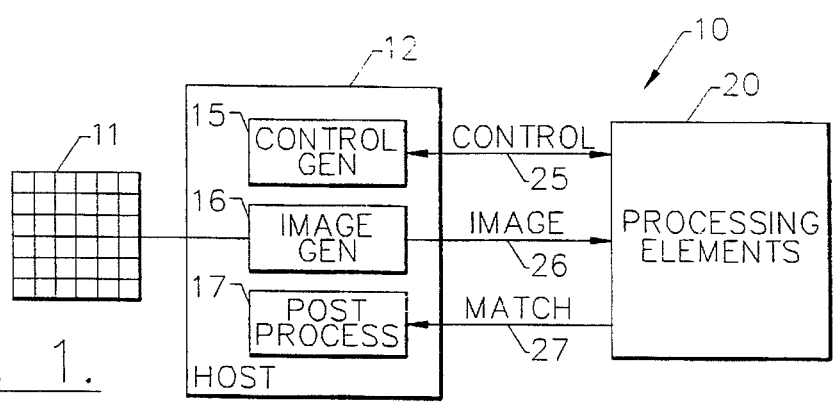
FIG. 1 illustrates an overall block diagram of an image processing system according to the present invention.

Referring now to FIG. 1, an overall block diagram of an image processing system according to the present invention is shown. As shown in FIG. 1, image processing system 10 includes three general components: image capture means 11, a host computer 12, and processing elements 20. Image capture means 11 may be a video camera or other well known means for providing an array of image data which is arranged in a plurality of rows and columns. The design of image capture means 11 is well known to those having skill in the art and need not be described further herein.

Host 12 is typically a general purpose data processor and may be a personal computer. Host 12 includes a control signal generator 15, an image generator 16 and a post processor 17. Control signal generator 15 generates control signals 25 for controlling processing elements 20. These control signals will be described in detail below. Image generator 16 serially applies the image data 26 to the first processing element as will be described in detail below. Post processor 17 is responsive to match data 27 which is generated by processing element 20 for producing an indication of the locations of all the relative matches in the image. The design of post processors is well known to those having skill in the art and need not be described further herein.

Figure 2:
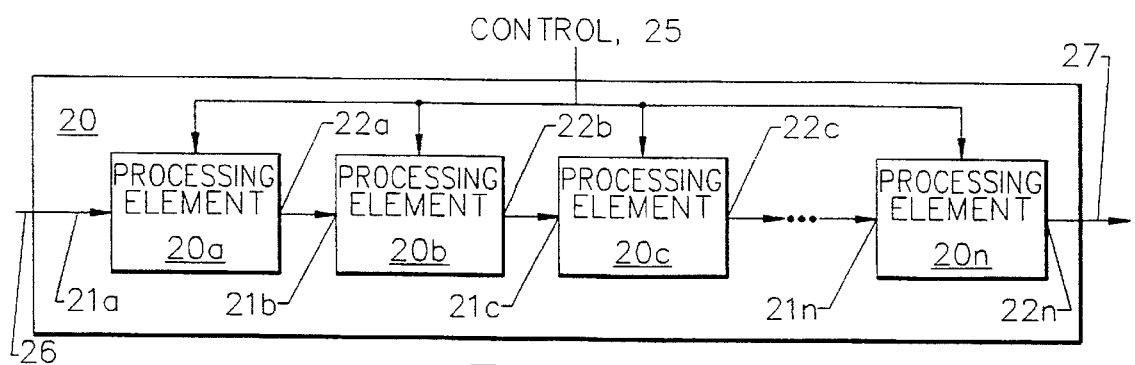
FIG. 2 illustrates a schematic block diagram of the interconnected processing elements of FIG. 1.

Referring now to FIG. 2, a schematic block diagram of processing elements 20 is illustrated. As shown, a plurality of serially connected processing elements 20a–20n are included. The number of processing elements is preferably at least as large as the number of data elements (pixels) in one row of the image data array which is to be processed. The number of processing elements can be larger or smaller than the number of data elements in the image data array. In particular, when there are more processing elements than data elements, the unused data elements can be masked, as will be described below. When the number of processing elements is less than the number of data elements, the same processing element can be used for different parts of the image space by dividing the image space into separate subspaces. The results of each subspace are then downloaded to post processor 17 prior to beginning the next subspace. As will be described below, the present invention allows additional processing elements to be added for higher speed of processing.

Still referring to FIG. 2, each processing element includes a data input 21a–21n and a data output 22a–22n, with the data output of an immediately preceding processing element being connected to the data input of an immediately succeeding processing element. As will be described below, image data 26 (FIG. 1) is serially provided to the first data input 21a and data 27 (FIG. 1) is obtained from the last data output 22n.

Still referring to FIG. 2, identical control signals 25 are provided to each processing element 20a–20n. Thus, processing elements can be added without changing the control complexity. Moreover, as also illustrated in FIG. 2, the control between processing elements 20 is free of (i.e. does not include) data input connections and data output connections with nonadjacent processing elements. In other words, processing elements 20a–20n are not connected as an array having a plurality of rows and columns. Rather, serial connection of data inputs and outputs is provided without cross-connections between nonadjacent elements. Expandability is thus obtained.

Figure 3:
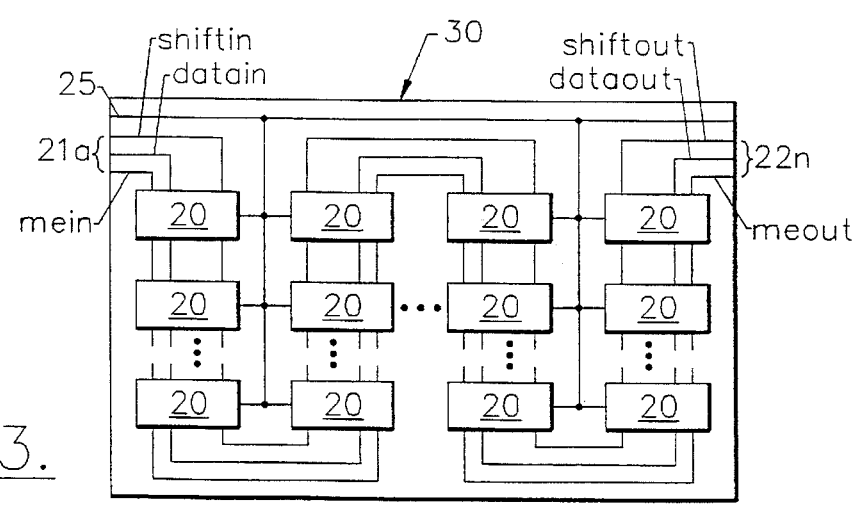
FIG. 3 illustrates an integrated circuit chip including a large number of processing elements of FIG. 2 formed therein.

As is well known to those having skill in the art, in parallel processing architectures a large number of processing elements are typically integrated into a single integrated circuit chip. FIG. 3 illustrates an integrated circuit chip 30 wherein a large number of processing elements 20 are formed in a semiconductor substrate. FIG. 3 indicates the general layout of the processing elements 20 and the common control bus 25. As shown, the processing elements 20 are typically connected in a serpentine serial pattern with a common control bus 25 for generating identical control signals for all processing elements 20. As also shown in FIG. 3, data input signals 21 are shown as three separate signals labelled mein, datain and shiftin, and data output signals 22 are shown as three separate signals labeled shiftout, meout and dataout. Detailed operation of these signals will be described below.

Figure 4:
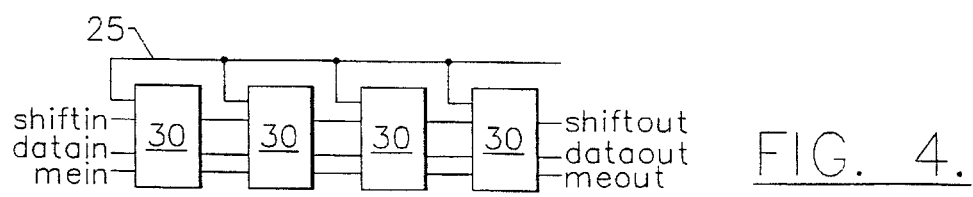
FIG. 4 illustrates a plurality of interconnected integrated circuit chips of FIG. 3.

FIG. 4 illustrates expandability of the system of the present invention. As shown, a plurality of integrated circuit chips 30 may be expandably connected by connecting the mein, datain and shiftin data inputs of the next chip to the meout, dataout and shiftout outputs of the preceding chip and by connecting the common control signals 25. The number of input/output and control lines is not a function of the number of processing elements or data elements, but rather is constant. Using state of the art Very Large Scale Integration/Ultra Large Scale Integration (VLSI/ULSI) technology, several thousand processing elements 20 can be formed on a single integrated circuit chip 30. Many more integrated circuit chips 30 may be cascaded on a single personal computer expansion board and mounted on a conventional personal computer expansion slot, to provide a high performance image processing system within the footprint of a personal computer.

Figure 5:
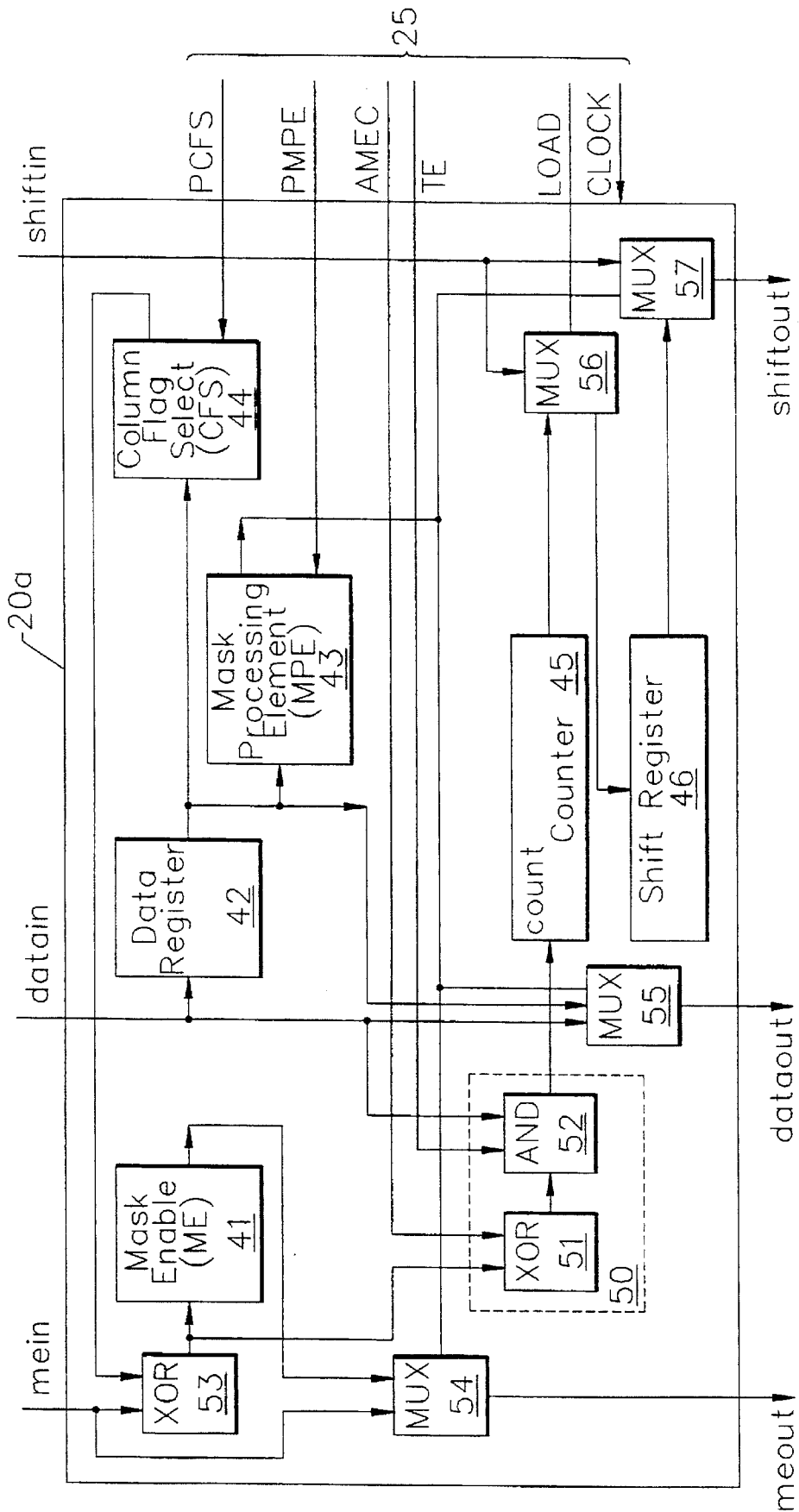
FIG. 5 illustrates an embodiment of a processing element of FIG. 2.

Referring now to FIG. 5, a preferred embodiment of a representative processing element 20a according to the present invention is illustrated. Each processing element includes column indicating means in the form of a Column Flag Select (CFS) register 44. The column indicating means is responsive to a column indicating signal, described below, to indicate to the associated processing element that the associated processing element corresponds to a predetermined one of the plurality of columns, to thereby demarcate the plurality of rows in the processing elements. An arbitrary size of rows and columns is thereby processed. The Column Flag Select register is a one bit register. A first binary value (for example ONE) in this register indicates that the processing element is representing one of the first columns in the array of image data. The Column Flag Select register 44 is loaded using the PCFS control signal, as described below.

Processing element 20 also includes masking means which is responsive to a masking signal to bypass the associated data comparing means such that an arbitrary size array of image data is processed by the processing elements. The masking means includes Mask Processing Element (MPE) register 43, which is also a one bit register. A first binary value (such as ONE) in this register indicates that the processing element is bypassed, and the data inputs (mein, datain and shiftin) are directly forwarded to the outputs (meout, dataout and shiftout) using multiplexors 54, 55, and 57, respectively. MPE register 43 is loaded by MPE control line, as described below.

Data register 42 is preferably a one bit register. It is used to store a single image data element (pixel) during image processing. For binary data, the bit provides a complete representation of the single image data element. For gray scale image data, the single bit represents one plane of the image data. Processing of the remaining planes is performed in a similar manner. As also shown, data register 42 is also used to shift a Column Flag Select signal into the Column Flag Select register 44 and to shift a Mask Processing Element Signal into Mask Processing Element register 43 during initialization as will be described below.

Processing element 20 also includes data processing means 50. Data processing means 50 is a circuit which processes input data at the input thereof provided by data register 42, using signals representing template data provided by Template Enable (TE) and Active Mask Enable Control (AMEC) lines. TE and AMEC are computer generated control signals which represent a template of a particular image. The generation of TE and AMEC signals will be described in detail below. As shown in FIG. 5, data processing means 50 includes an EXCLUSIVE OR gate 51 and an AND gate 52. The output of the processing means is "count". Count is a function of four variables: ME, AMEC, DATA and TE. A count of ONE is produced when an intersection of input image data and the corresponding template control signals is present in the processing element.

Still referring to FIG. 5, Mask Enable (ME) register 41 is also a one bit register. A ONE in this register ingrates a cross correlation of a column in the image with a column in the template. As shown, the content of ME is a function of mein and the output of Column Flag Select register 44.

The output of the processing means 50 (count) is provided to counter 45. Counter 45 is a multibit accumulator. Initially, counter 45 is reset to zero (no match). It increases by one every time the count control line is asserted, thereby accumulating the total number of intersections between the template signals and the image data for the associated processing element. Thus, the value of the counter of each Processing Element at the end of processing represents the number of intersects of image data and the corresponding arbitrary reference point of template data (image space). For every subpartition, the highest value of count represents the best match as described below.

Finally, Shift Register 46 is a multibit register preferably the same size as counter 45. A ONE on the LOAD control line will load the contents of the counter into the shift register. Otherwise, in each operation cycle, the contents of the shift register will shift out and the shiftin will be stored in the shift register via multiplexors 56 and 57, respectively.

Figure 6:
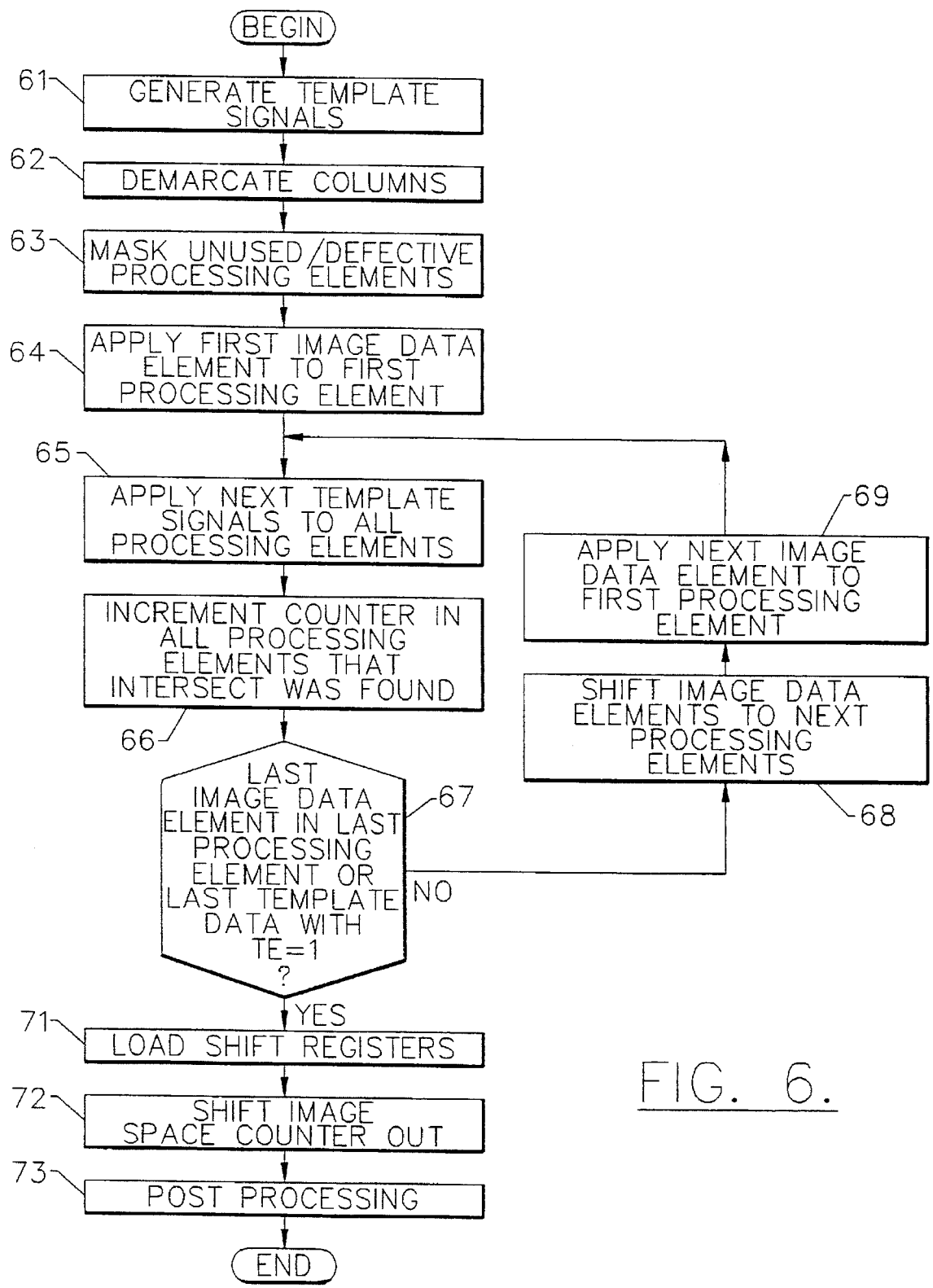
FIG. 6 illustrates operations performed by the image processing system of FIG. 1 to process an array of image data.

FIG. 6 illustrates operations performed by the image processing system of FIG. 1 to process an array of image data. Operations begin by performing initialization procedures. These initialization procedures are indicated generally at Blocks 61–63. It will be understood that these initialization operations may be performed in any arbitrary order, but are all performed prior to actually processing image data. It will be understood that the initialization procedures need only be performed once for each image data array size, and need not be performed for every pattern matching operation.

At Block 61, template signals are generated, preferably before image processing takes place. The template signals are the TE and AMEC control signals shown in FIG. 5. The host computer 12 or any other computer may be used to generate the template signals flow template data as will now be described. It will be understood that the template may include a plurality of patterns to be recognized, and that these patterns will be recognized regardless of their relative locations in the image data. All multiple exact or similar patterns will also be recognized at once.

Both TE and AMEC are one bit data for a binary image and a plane of gray scale image. Each non-zero template data element (pixel) in the template frame is converted to an integer value (template count) to represent its location in the x-y plane. Template count is denoted as Si, where i runs from 1-k and k is the number of non-zero pixels in the template data. Si represents the sequential count corresponding to the time that the image data of the template intersects with the arbitrary reference point in the template data. Each integer value, Si, is computed from the following formula:

$$Si = C(R-(Xi-RefX))-(Yi-RefY)$$

where

C is the size of the column in the template frame

R is the size of the row in the template frame

Xi is the x location of the pixel in the template data

Yi is the y location of the pixel in the template data yi is the y distance to RefY, i.e. yi=Yi−RefY RefX is the x location of a selected reference point in the template data and RefY is the y location of the selected reference point in the template data Assume Max is the maximum of all Sis, then the following pseudo-code can be used to generate TE and AMEC:

```
start process:
  i=1;
  for j=1 to Max do while (i<=k):
    if Si=j then do as follows:
      TEj=1;
      T=mod(int((Si-1)/C),2);
      if(T=0 and yi>=0) or
        (T=1 and yi<0)
        then AMECj=0;
      else AMECj=1;
      i=i+1;
    end if-follows;
    otherwise do as follows:
      TEj=0;
      AMECj=0;
    end otherwise-follows;
  end for-while;
end process.
```

Thus, TE=1 represents that an intersect of the image data and the reference point is possible. The value of AMEC indicates whether the intersect could be out-boundary or in-boundary, while processing. In other words, AMEC is part of representing whether the pixel is to the left of the template or to the right of the template.

Referring now to Block 62 of FIG. 6, columns are then demarcated by setting the Column Flag Select register 44 to the proper logic value. The CFS register 44 will be set to ONE if the processing element is used to represent the first column of any row of the image, and to ZERO otherwise. The ZERO and ONE values are applied to the Column Flag Select register 44 by shifting the data values into Data Register 42 using datain and dataout lines and then by asserting the PCFS control line, which loads the column select register with the associated signal in data register 42 in all processing elements at one time. This initialization is only needed once for any particular image size and does not need to be repeated for every template matching process.

Referring again to FIG. 6, unused and/or defective processing elements are masked at Block 63. Masking is done by loading Mask Processing Element (MPE) register 43 with a ONE if the processing element is bypassed and a ZERO if the processing element is active. MPE register 43 is also loaded using Data Register 42 and the datain and dataout lines, and controlled via control signal PMPE. Again, this operation is only needed once for any particular image size and does not need to be repeated for every template matching process.

Pattern processing operations then begin. At Block 64, a first image data element is applied to the first processing element. The image data is applied to the datain of the first processing element along with mein input data and the shiftin data. Shiftin is not used during input data processing. Datain is a string of image data in one row after another. The last image data may be shifted in first. However, other image shift sequences may be used as long as a consistent sequence is maintained with the template data. Mein toggles starting from C ZEROs to C ONEs continuously where C is the number of columns in the array of image data. Datain is pulled down after all of the image data is shifted into the system and the process continues until all template control signals are used.

Referring now to Block 65, at the same time that the mein and datain signals are applied, the control lines for every processing element are activated. In particular, the TE and AMEC template signal control lines are activated when the proper image data element has reached the proper image processor. As the image data shifts through the system, the template signal processing takes place in all processing elements simultaneously. With each operation sequence (system CLOCK) the data in each processing element will be shifted to the next processing element while the internal control signals are modified at the same time. After each image data element passes through every processor, or the last TE control line having a ONE, whichever comes first, template matching is complete and all patterns within the image matched with the template are recognized. See Block 67.

Each time an intersect occurs at any processing element, its associated counter 45 is incremented at Block 66. Thus, similarity of the template at each location in the image space will be known by the value of the counter 45 for that space in each processing element. A ONE on the LOAD control line will load the contents of counters in all processing elements into the shift registers at Block 71, which will then be shifted out at Block 72. Postprocessing is used at Block 73 to recognize the best match by the maximum value in the shift registers.

Referring again to Block 67, until the last image data element is in the last processing element or the last TE=1, at each clock cycle the image data elements are shifted to the next processing element at Block 68 and the next image data element is applied to the first processing element at Block 69. The template data is then reapplied at Block 65 and the counter is incremented if there is a match at Block 66.

A Cray supercomputer was used to conduct a set of simulations to compare image processing in a general purpose data processor with the present invention. In the simulations, 9126 matches of 32×32 images were performed. This required 15,000 seconds of processing time which may only take a few seconds using the present invention. For this simulation, a database of image spaces and templates, which is commercially available for experiments in pattern processing research and development and which contains patterns similar to those found in general alphabetic characters, was used. One hundred thirty different templates representing 26 distinct patterns were used to explore different possibilities and to verify the effectiveness of the present invention.

After all simulations were completed, the similarity ratio between the images and templates were stored and analyzed. The present invention performed with 100% accuracy. The pattern matching technique recognized every pattern to the exact degree of similarity present (this ranged from 72–100%) and to the accuracy and precision of a single pixel. In a second run, about 5% of inappropriate image spaces were included in the data base. All were detected.

Simulations were also conducted for images of 256×256 and 512×512 using a variety of computer systems, including a conventional 386 microcomputer, Sun Sparcstation 2, and DEC VAX mainframe 3850. These simulations showed that the present invention has great potential in applications dealing with finding a known pattern in an image. For a 512×512 template and image space, the ratio difference between using the present invention and using a general purpose computer is on the order of 262144. Realistically, it takes more than four computational steps for each order, coming to a difference of one million (six orders of magnitude) faster than the sequential process, using 512× 512 image data and a complete matching process. Thus, for objects with large pixel size, one would expect the present invention to have significantly greater speed than a general purpose processor. The ratio difference increases as the number of pixels per pattern increases.

The matching operation performed by the present invention is similar to the generalized Hough transform. The Hough transform as first proposed in U.S. Pat. No. 3,069, 654 was designed to find straight lines in images. For an arbitrary shape, the transform has been generalized by D. H. Ballard in "Generalizing the Hough Transform to Detect Arbitrary Shapes," Pattern Recognition, Vol. 13, No. 2, 1981, and by Stephen D. Shapiro in "Generalization of the Hough Transform for Curve Detection in Noisy Digital Image," Proc. 4th Int. Joint Conf. Pattern Recognition, Kyoto, Japan, 1987. Either transform has been proven to be accurate and reliable. However, they also have been proven to be highly time consuming, making them impractical for use in a sequential process. The usual application using either transform is centered around binary images obtained by thresholding of gray scale images. A simplified pseudocode description of the generalized transform for arbitrary shapes is shown below.

A specific pattern can be described in a table, as a template, that gives all two-dimensional vectors from an arbitrary reference point to the pixels in the pattern. Assume a parameter space (PS, representing one accumulator for each pixel) of the same size and dimension as the image space (IS, a frame of image represented by pixels). Then, the value at each point in parameter space, PS(i,j), increases incrementally each time a pixel in the image space, IS(i,j), passes through an identified point as follows:

| | |
|---|---|
| Given PS(i,j) | as a parameter space accumulator |
| IS(i,j) | a pixel in the original picture |
| Vx(k) | as the x axis coordinate values of the template table |
| Vy(k) | as the y axis coordinate values of the template table |
| N | the number of pixels in any row or column of parameter space |
| K | the number of pixels in the table |
| then: | |
| for i=1 to N | |
| for j=1 to N | |
| for k=1 to K | |
| PS(i,j)=PS(i,j)+IS(i+Vx(k),j+Vy(k)) | |
| Note: | IS(a,b)=0,if a and/or b is out of boundary of the picture frame. |

Then, each point (i,j) in the parameter space with value K will indicate the presence of a pattern with reference point R=(i,j), which precisely matches the pattern described in the table.

For high quality pattern matching and for precision verification of a pattern, one will have to use templates with large numbers of pixels to restore as much detailed information as possible. Thus, the sequential process becomes unrealistically long. However, if the present invention is used, the computation on all image pixels in each step of the match can be achieved simultaneously.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An image processing system for an array of image data arranged in a plurality of rows and columns, said image processing system comprising:

a plurality of serially connected processing elements, each of said processing elements including a data input and a data output, with the data output of an immediately preceding processing element being connected to the data input of an immediately succeeding processing element;

image data input means for serially providing a sequence of image data from said array of image data to the data input of a first of said processing elements, such that the provided image data from said array of image data is serially shifted through said processing elements;

means for generating a series of template data signals which represent a template;

means for serially applying predetermined template data signals, wherein the template data signals represent a portion of the entire template, to each of said processing elements simultaneously such that each of said processing elements receives the same template signals simultaneously;

each of said processing elements including means for processing data at the input thereof using said template signals which are simultaneously applied thereto;

initializing means, responsive to a column indicating signal, for demarcating groups of processing elements corresponding to said plurality of columns of said image data, such that an arbitrary size of said plurality of rows and columns is processed by said processing elements; and each of said processing elements further including masking means, responsive to a masking signal, for bypassing the associated processing means, such that an arbitrary size of said array of image data is processed by said processing elements.

2. An image processing system according to claim 1 wherein said initializing means comprises a Column Flag Select register in each of said processing elements which stores therein a first binary value if the associated processing element demarcates a group of processing elements, and a second binary value otherwise, said data processing means being responsive to said Column Flag Select register.

3. An image processing system according to claim 1 wherein said initializing means demarcates processing elements which correspond to a first one of said plurality of columns.

4. An image processing system according to claim 2 wherein said masking means comprises a Mask Processing Element register, for storing therein a first binary value if the associated comparing means is bypassed, and a second binary value otherwise, said processing element being responsive to said Mask Processing Element register to couple the associated data input to the associated data output in response to said first binary value and to couple the associated data input to said comparing means in response to said second binary value.

5. An image processing system according to claim 4 wherein each of said processing elements further includes:

counting means, responsive to said data processing means, for counting a number of occurrences of intersections between said data at the input thereof and an arbitrary reference point in said template.

6. An image processing system according to claim 5 wherein each of said processing elements further includes a shift register, responsive to said counting means, for providing said number of occurrences of intersections to a post processing system.

7. An image processing system according to claim 1 further comprising:

means for providing identical control signals to each of said plurality of processing elements simultaneously.

8. An image processing system according to claim 1 wherein said plurality of processing elements are free of data input connections and data output connections with nonadjacent processing elements.

9. An image processing system for an array of image data arranged in a plurality of rows and columns, said image processing system comprising:

a plurality of serially connected processing elements, each of said processing elements including a data input and a data output, with the data output of an immediately preceding processing element being connected to the data input of an immediately succeeding processing element;

image data input means for serially providing a sequence of image data from said array of image data to the data input of a first of said processing elements;

means for generating a series of template data signals which represent a template;

means for serially applying predetermined template data signals, wherein the template data signals represent a portion of the entire template, to each of said processing elements simultaneously such that each of said processing elements receives the same template signals simultaneously;

each of said processing elements including means for shifting image data from the data input thereof to the data output thereof to thereby serially shift the provided image data from said array of image data through said processing elements; and each of said processing elements including means for processing image data at the input thereof using the template data signals simultaneously applied thereto.

10. An image processing system according to claim 9 wherein each of said processing elements further includes:

counting means, responsive to said data comparing means, for counting a number of occurrences of intersections between said data at the input thereof and an arbitrary reference point in said template.

11. An image processing system according to claim 10 wherein each of said processing elements further includes a shift register, responsive to said counting means, for providing said number of occurrences of intersections to a post processing system.

12. An image processing system according to claim 9 further comprising:

means for providing identical control signals to each of said plurality of processing elements simultaneously.

13. An image processing system according to claim 9 wherein said plurality of processing elements are free of data input connections and data output connections with nonadjacent processing elements.

14. An image processing system according to claim 9 wherein said generating means comprises means for generating a first template data signal which represents that an intersect of image data and a reference point of a template is possible, and a second template data signal which represents that the intersect is to the left or right of the template; and wherein said processing means comprises:

means for performing a logic EXCLUSIVE-OR of a mask enable signal and said second template data signal; and means for performing a logic AND of the results of the EXCLUSIVE-OR, said first template data signal and said image data at the input thereof.

15. An image processing system for an array of image data arranged in a plurality of rows and columns, said image processing system comprising:

a plurality of serially connected processing elements, each of said processing elements including a data input and a data output, with the data output of an immediately preceding processing element being connected to the data input of an immediately succeeding processing element;

means for generating a series of template data signals which represent a template;

means for serially applying predetermined template data signals, wherein the template data signals represent a portion of the entire template, to each of said processing elements simultaneously such that each of said processing elements receives the same template signals simultaneously;

each of said processing elements including means for processing data at the input thereof using template signals which represent a template; and initializing means, responsive to a column indicating signal, for demarcating groups of processing elements corresponding to said plurality of columns of said image data, such that an arbitrary size of said plurality of rows and columns is processed by said processing elements.

16. An image processing system according to claim 15 wherein said initializing means comprises a Column Flag Select register in each of said processing elements which stores therein a first binary value if the associated processing element demarcates a group of processing elements, and a second binary value otherwise, said data processing means being responsive to said Column Flag Select register.

17. An image processing system according to claim 15 wherein said initializing means demarcates processing elements which correspond to a first one of said plurality of columns.

18. An image processing system according to claim 15 wherein each of said processing elements further includes:

counting means, responsive to said data comparing means, for counting a number of occurrences of intersections between said data at the input thereof and an arbitrary reference point in said template.

19. An image processing system according to claim 18 wherein each of said processing elements further includes a shift register, responsive to said counting means, for providing said number of occurrences of intersections to a post processing system.

20. An image processing system according to claim 15 further comprising:

means for providing identical control signals to each of said plurality of processing elements simultaneously.

21. An image processing system according to claim 15 wherein said plurality of processing elements are free of data input connections and data output connections with nonadjacent processing elements.

22. An image processing system for an array of image data arranged in a plurality of rows and columns, said image processing system comprising:

a plurality of serially connected processing elements, each of said processing elements including a data input and a data output, with the data output of an immediately preceding processing element being connected to the data input of an immediately succeeding processing element;

each of said processing elements including means for processing data at the input thereof using template signals which represent a template; and each of said processing elements further including masking means, responsive to a masking signal for bypassing the associated processing means of a predetermined number of said processing elements which are greater than the array of image data, such that an arbitrary size of said array of image data is processed by said processing elements notwithstanding that there are more processing elements than the array of image data;

wherein said masking means comprises a Mask Processing Element register, for storing therein a first binary value if an associated comparing means is bypassed, and a second binary value otherwise, said processing element being responsive to said Mask Processing Element register to couple the associated data input to the associated data output in response to said first binary value and to couple the associated data input to said comparing means in response to said second binary value.

23. An image processing system according to claim 22 wherein each of said processing elements further includes:

counting means, responsive to said data comparing means, for counting a number of occurrences of intersections between said data at the input thereof and an arbitrary reference point in said template.

24. An image processing system according to claim 23 wherein each of said processing elements further includes a shift register, responsive to said counting means, for providing said number of occurrences of intersections to a post processing system.

25. An image processing system according to claim 22 further comprising:

means for providing identical control signals to each of said plurality of processing elements simultaneously.

26. An image processing system according to claim 22 wherein said plurality of processing elements are free of data input connections and data output connections with nonadjacent processing elements.

27. A method for processing an array of image data having a plurality of rows and columns, in a plurality of serially connected processing elements, each of said processing elements including a data input and a data output, with the data output of an immediately preceding processing element being connected to the data input of an immediately succeeding processing element, each of said processing elements including means for processing data at the input thereof using template signals which represent a template, said image data processing method comprising the steps of:

initializing said processing elements by demarcating groups of said processing elements corresponding to said plurality of columns of said image data, such that an arbitrary size of said plurality of rows and columns is processed by said processing elements;

initializing said processing elements by bypassing selected data processing means of a predetermined number of said processing elements which are greater than the array of image data, such that an arbitrary size of said array of image data is processed by said processing elements; and applying image data and template signals to the demarcated and bypassed plurality of serially connected processing elements.

28. A method according to claim 27 wherein said applying step comprises the step of:

serially providing said array of image data to the data input of a first of said processing elements, such that said array of image data is serially shifted through said processing elements.

29. A method according to claim 27 wherein said masking step comprises the step of:

providing a masking signal to the processing elements associated with said selected data processing means, for bypassing the associated data processing means, such that an arbitrary size of said array of image data is processed by said processing elements.

30. A method according to claim 27 wherein said demarcating step comprises the step of:

storing a first binary value in a Column Flag Select register associated with each processing element which demarcates a group of processing elements, and a second binary value otherwise.

31. A method according to claim 27 wherein said demarcating step comprises the step of:

demarcating groups of said processing elements which correspond to a first one of said plurality of columns.

32. A method according to claim 29 wherein said providing step comprises the step of:

storing a first binary value in a Mask Processing Element register associated with each processing element if the associated comparing means is bypassed, and a second binary value otherwise; and coupling the associated data input to the associated data output in response to said first binary value; and coupling the associated data input to said comparing means in response to said second binary value.

33. A method according to claim 27 further comprising the step of:

providing identical control signals to each of said plurality of processing elements simultaneously.

* * * * *

UNITED STATES PATENT AND TRADEMARK OFFICE
CERTIFICATE OF CORRECTION

PATENT NO. : 5,642,444
DATED : June 24, 1997
INVENTOR(S) : M. Taghi Mostafavi

It is certified that error appears in the above-identified patent and that said Letters Patent is hereby corrected as shown below:

Title page, item [73], Assignee: add --University or North Carolina, Charlotte, N.C.--

On the title page, Column 2, Add: --Attorney, Agent, or Firm: Bell, Seltzer, Park & Gibson, P.A.--.

On the title Page, Column 1, line 2, U.S. References, delete "2/1980" and insert --3/1990-- therefor.

Signed and Sealed this

Twenty-third Day of December, 1997

Attest:

BRUCE LEHMAN

Attesting Officer

Commissioner of Patents and Trademarks